US012682365B2

(12) United States Patent
Gilmore

(10) Patent No.: US 12,682,365 B2
(45) Date of Patent: Jul. 14, 2026

(54) SYSTEM AND METHOD FOR CORRELATING AND ENHANCING DATA OBTAINED FROM DISTRIBUTED SOURCES IN A NETWORK OF DISTRIBUTED COMPUTER SYSTEMS

(71) Applicant: TrueCar, Inc., Santa Monica, CA (US)

(72) Inventor: Rudy C. Gilmore, Kirkland, WA (US)

(73) Assignee: TRUECAR, INC., Santa Monica, CA (US)

( * ) Notice: Subject to any disclaimer, the term of this patent is extended or adjusted under 35 U.S.C. 154(b) by 0 days.

(21) Appl. No.: 18/594,325

(22) Filed: Mar. 4, 2024

(65) Prior Publication Data
US 2024/0211977 A1 Jun. 27, 2024

Related U.S. Application Data

(63) Continuation of application No. 18/156,455, filed on Jan. 19, 2023, now Pat. No. 11,966,933, which is a continuation of application No. 16/460,259, filed on Jul. 2, 2019, now Pat. No. 11,593,818.

(60) Provisional application No. 62/695,605, filed on Jul. 9, 2018.

(51) Int. Cl.
| | |
|---|---|
| *G06Q 30/00* | (2023.01) |
| *G06F 16/9035* | (2019.01) |
| *G06N 20/00* | (2019.01) |
| *G06Q 10/067* | (2023.01) |
| *G06Q 30/02* | (2023.01) |
| *G06Q 30/0201* | (2023.01) |

(52) U.S. Cl.
CPC ..... *G06Q 30/0201* (2013.01); *G06F 16/9035* (2019.01); *G06N 20/00* (2019.01); *G06Q 10/067* (2013.01); *G06Q 30/02* (2013.01)

(58) Field of Classification Search
CPC .. G06Q 30/0201; G06Q 10/067; G06Q 30/02; G06F 16/9035; G06F 16/9535; G06N 20/00; G06N 5/025; G06N 5/04
See application file for complete search history.

(56) References Cited

U.S. PATENT DOCUMENTS

| | | | | |
|---|---|---|---|---|
| 7,627,550 B1* | 12/2009 | Adams | ............. | G06F 16/24556 |
| | | | | 707/999.005 |
| 2008/0033939 A1* | 2/2008 | Khandelwal | ........ | G06F 16/9535 |
| | | | | 707/999.005 |
| 2008/0162487 A1* | 7/2008 | Richter | .................. | G06Q 10/00 |
| 2009/0171761 A1* | 7/2009 | Noy | ........................ | G06Q 40/10 |
| | | | | 705/26.1 |
| 2010/0070382 A1* | 3/2010 | Inghelbrecht | ...... | G06Q 30/0623 |
| | | | | 705/347 |

(Continued)

*Primary Examiner* — Beth V Boswell
*Assistant Examiner* — Tyrone E Singletary
(74) *Attorney, Agent, or Firm* — Sprinkle IP Law Group

(57) ABSTRACT

Systems and methods herein provide for sophisticated and efficient matching between users of a vehicle data system and data on sales that occur, where that data was obtained from distributed sources across a computer network. In particular, embodiments may obtain data from a variety of data sources across a distributed network and enhance data records by correlating the data obtained from these distributed sources. Data on sales thus obtain can be correlated with data on online users of the vehicle data system using a scoring engine to provide confidence scores to potential user-sale matches.

21 Claims, 7 Drawing Sheets

(56)            References Cited

U.S. PATENT DOCUMENTS

| | | | |
|---|---|---|---|
| 2011/0082759 A1* | 4/2011 | Swinson ................ | G06Q 30/02 |
| | | | 705/26.1 |
| 2011/0161197 A1* | 6/2011 | Noy ................... | G06Q 30/0205 |
| | | | 705/347 |
| 2013/0191466 A1* | 7/2013 | Perlow .................... | H04L 51/52 |
| | | | 709/206 |
| 2014/0074553 A1* | 3/2014 | Sullivan ............. | G06Q 30/0203 |
| | | | 705/7.29 |
| 2014/0180882 A1* | 6/2014 | Berger ................... | G06Q 30/06 |
| | | | 705/30 |
| 2018/0096372 A1* | 4/2018 | Rickard, Jr. ............. | G06N 5/01 |
| 2019/0318031 A1* | 10/2019 | Sim .......................... | G06N 3/09 |
| 2020/0111100 A1* | 4/2020 | Adjaoute ........... | G06Q 20/4016 |

* cited by examiner

210 ⮑ OBTAIN DATA FROM SOURCES

220 ⮑ CLEANSE DATA

230 ⮑ OPTIMIZE / NORMALIZE HISTORICAL SETS

240 ⮑ GENERATE MODELS

250 ⮑ RECEIVE VEHICLE CONFIGURATION AND PRICE

255 ⮑ RECEIVE TIME WINDOW

260 ⮑ DETERMINE DATA

264 ⮑ DETERMINE PRICING DATA

270 ⮑ GENERATE INTERFACE

280 ⮑ DISTRIBUTE INTERFACE

SYSTEM AND METHOD FOR CORRELATING AND ENHANCING DATA OBTAINED FROM DISTRIBUTED SOURCES IN A NETWORK OF DISTRIBUTED COMPUTER SYSTEMS

RELATED APPLICATIONS

This application is a continuation of, and claims a benefit of priority under 35 U.S.C. 120 from, U.S. patent application Ser. No. 18/156,455, filed Jan. 19, 2023, issued as U.S. Pat. No. 11,966,933, entitled "SYSTEM AND METHOD FOR CORRELATING AND ENHANCING DATA OBTAINED FROM DISTRIBUTED SOURCES IN A NETWORK OF DISTRIBUTED COMPUTER SYSTEMS," which is a continuation of, and claims a benefit of priority under 35 U.S.C. 120 from, U.S. patent application Ser. No. 16/460,259, filed Jul. 2, 2019, issued as U.S. Pat. No. 11,593,818, entitled "SYSTEM AND METHOD FOR CORRELATING AND ENHANCING DATA OBTAINED FROM DISTRIBUTED SOURCES IN A NETWORK OF DISTRIBUTED COMPUTER SYSTEMS," which claims a benefit of priority under 35 U.S.C. § 119(e) from U.S. Provisional Application No. 62/695,605, filed Jul. 9, 2018, entitled "SYSTEM AND METHOD FOR CORRELATING AND ENHANCING DATA OBTAINED FROM DISTRIBUTED SOURCES IN A NETWORK OF DISTRIBUTED COMPUTER SYSTEMS." All applications referenced in this paragraph are fully incorporated by reference herein for all purposes.

COPYRIGHT NOTICE

TECHNICAL FIELD

The present disclosure relates generally to distributed and networked computer systems. More particularly, the present disclosure relates to the use of distributed and networked computer systems in the collection and enhancement of data in a distributed network environment and the use of the enhanced data for the enhancement and correlation of data gathered from across the distributed network. Even more specifically, the present disclosure relates to improving the use of distributed and networked computer systems for the collection, enhancement and correlation of data from across the distributed network which may be usefully applied in a variety of contexts, including in the context of vehicle sales to, for example, implement sales matching system which may collect, enhance and data related to users of a vehicle data system with sales data collected from a data sources distributed across a computer network.

BACKGROUND

Today, the Internet is a useful tool for purchasing products or services. The implementation of systems on the Internet is, however, fraught with technical complexity. This situation exists in no small part because of the distributed nature of the data sources and other computing systems with which systems may interact while providing data or services over the network and the requirement that such interactions occur in real-time as expected by users of the Internet.

A microcosm of this problem occurs in the context of vehicle data systems that may be provided by operators that are not dealers or other sellers (collectively dealers) of vehicles and who may have users that may purchase vehicles from dealers, where these purchases may occur through other channels than the vehicle data system.

However, given the technical complexity of the Internet, the presentation of data including websites across the Internet and the interactions between websites and users or those websites, it may often times be difficult to correlate activities occurring in association with one system or website with activities occurring with a distinct system or website, or offline activities.

What is desired, therefore, are improved systems and methods to correlate activities in a distributed computer network.

SUMMARY

To reiterate, the Internet is a useful tool for purchasing products or services, especially in the context of vehicle sales or purchases. The implementation of vehicle data system on the Internet are subject to the same technical complexity as other systems on the Internet. As an example, these problems occur in the context of vehicle data systems that may be provided by operators that are not dealers of vehicles and who may have users that may purchase vehicles from dealers, where these purchases may occur through other channels than the vehicle data system. For example, a sale may occur online (or offline) after a user data has been provided from the vehicle data system to a dealer, which may identify one or more prospective users (e.g., where the vehicle data system may be operated by an entity of other than the dealer).

Typically, in such situations, the operators of the vehicle data system may be compensated by the dealer for the user data, especially in cases where the provisioning of the user data leads to a sale of a vehicle. For example, in the vehicle sales industry, a vehicle data system may provide a website that may be accessed by users seeking information. For example, a user may seek information on a vehicle in order to receive information about car dealerships and contact or be contacted by these car dealers. In these types of situations, operators of the vehicle data system may provide data regarding that user to a dealer whereby the dealer could compensate the operator of the vehicle data system in certain instances.

Sometime, such compensation may be based on easily measurable events such as banner views, page clicks, or the provisioning of the user data itself. Since this type of information may be easily tracked by the vehicle data system (e.g., tracking user views, clicks on an advertisement, or the providing of user data), determining when to charge or bill a dealer may be relatively straightforward.

These events, however, may not provide an accurate indication of how when the providing of user data to a dealer actually results in a sale. When a user data is provided, many different actions can occur. For instance, with respect to an online vehicle data system, a user submitting user information may (1) not purchase at all, (2) purchase somewhere else (e.g., other than the dealer to whom the user data was provided or which was shown to a user in an interface of the vehicle data system), (3) purchase the researched vehicle from the dealer, or (4) purchase a different product from the same dealer (e.g., which may not exactly match the user data sent to the dealer).

Although there might be an increased likelihood of a vehicle sale occurring from the number of times an advertisement is viewed or user data created or provided this information may not provide any accurate indication of how or when user data leads to a sale. Unlike the advertisement and user data information, data related to sales (or proxy for sales such as new vehicle registration, insurance, etc.) may not be in the vehicle data system's control, and may mainly reside in other distributed data sources within a network, such as the dealer's systems, department of motor vehicles, insurance systems, or other systems.

Even if an operator of a vehicle data system wanted to receive information from a dealer about whether the provisioning of user data by the vehicle data system led to a sale, the nature of the relationship is such that operators of the vehicle data system would not be able to rely on the dealer to self-report sales. The dealers have very little incentive to keep track of provided user data that become actual sales because a successful determination only results in the dealer having to compensate the operators of vehicle data system. Additionally, even if a dealer wanted to provide user data and sales, it would need to expend a great deal of computing resources to follow exactly what user data has been provided and what of that user data led to a successful purchase of a car, and that effort could be costly to the dealer.

There is thus a need for improved systems and methods of sales matching that may accurately determine what user data has been provided to dealers and resulted in actual sales.

Specifically, what is desired is the ability of vehicle data system providers to identify sale-user pairs that can be claimed with a high degree of confidence such that operators of vehicle data system may make decisions about, for example, dealer billing and subscription rates based on such sale-user matches.

To that end, among others, attention is thus directed to the systems presented here, which provide for the determination of matches between users of a vehicle data system and data on sales that occur, where that data was obtained from distributed sources across a computer network. In particular, embodiments may obtain data from a variety of data sources across a distributed network and enhance data records by correlating the data obtained from these distributed sources.

In certain embodiments, a vehicle data system may include a scoring engine (SE) to provide confidence scores to potential user-sale matches. The SE reads in the Personally Identifying Information (PII) for prospective matches that have been selected on the basis of broad matches in one or more PII categories and returns a set of ranked confidence scores for each sale that incorporate the composite strength the match in all PII categories. These can be used, for example, for reporting or to make billing decisions.

Embodiments of such a scoring engine may address and overcome at least two fundamental difficulties with implementing sales matching within a distributed networked computer environment including a vehicle data system. The first of these is that such SE may be able to automatically provide quality confidence scores for a sale-user pair, even though the pair and its associated data may not exist in historical records. The system may therefore be able to infer a result based on similar cases in past data. Second, such a SE may be able to automatically detect valid sales even though there are an astronomically high number of potential sale-user pairs that can be constructed from the data feeds each month. This number may be in the trillions so, in certain embodiments, the SE may include efficient prefiltering to avoid submitting all possible pairs to a more complex decision algorithm.

Embodiments thus provide a variety of technological advantages, including the collection, correlation and enhancement of data from a variety of distributed sources. Moreover, embodiments may enable the efficient and speedy determination of sales matches that may be utilized in real-time to generate or make invoicing or billing decisions.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a HD), hardware circuitry or the like, or any combination.

As discussed above, there are a number of unmet desires when it comes to systems and methods of sales matching that may accurately determine what user data has been provided to dealers and resulted in actual sales. Specifically, what is desired is the ability of vehicle data system providers to identify sale—user pairs that can be claimed with a high degree of confidence such that operators of vehicle data system may make decisions about, for example, dealer billing and subscription rates based on such sale-user matches.

To that end, among others, attention is thus directed to the systems presented here, which provide for the determination of matches between users of a vehicle data system and data on sales that occur, where that data was obtained from distributed sources across a computer network. In particular, embodiments may obtain data from a variety of data sources across a distributed network and enhance data records by correlating the data obtained from these distributed sources.

Figure 1:
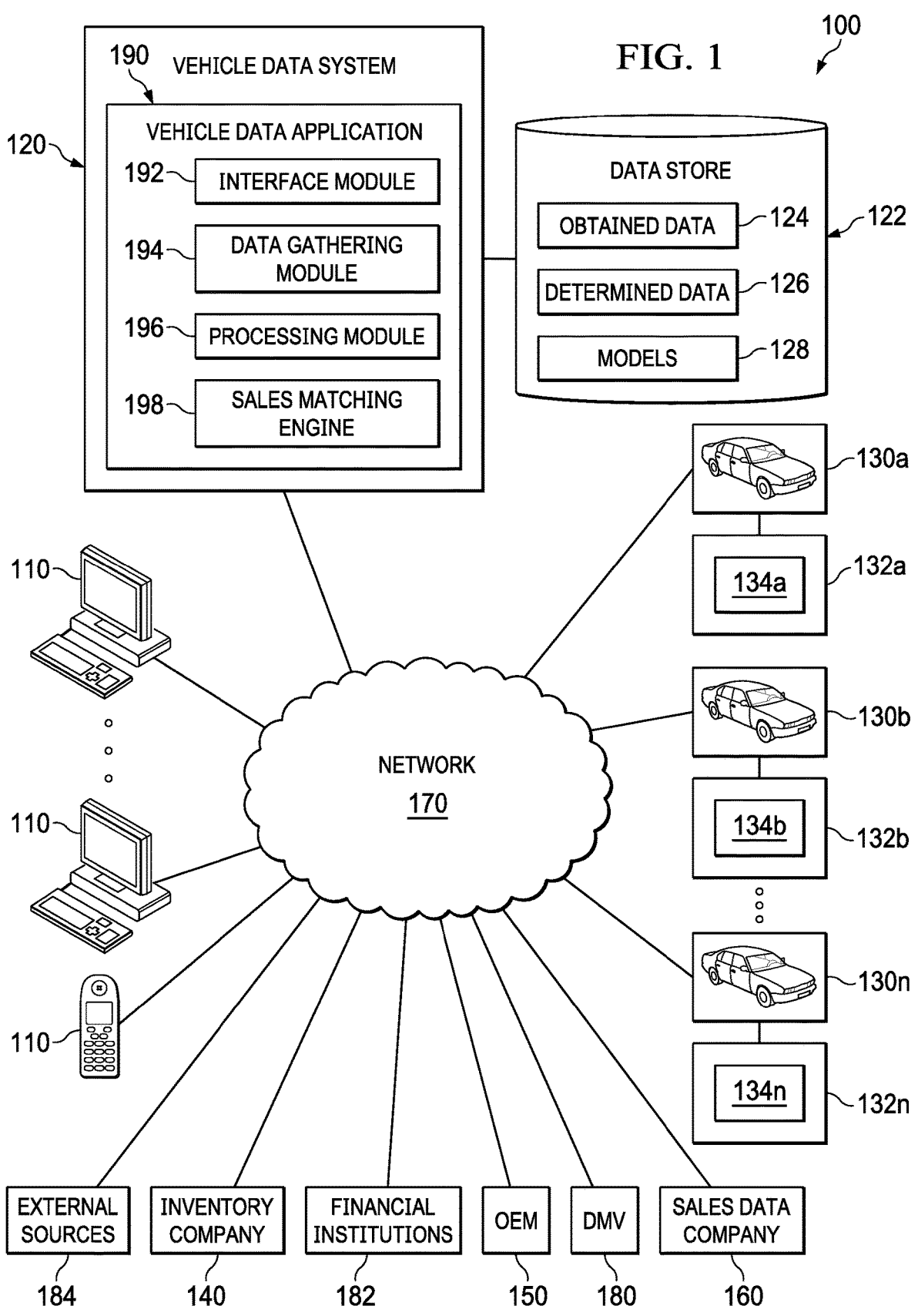
FIG. 1 is a block diagram of one embodiment of a topology of a distributed computer network, including a vehicle data system.

Embodiments of the systems and methods of the present invention may be better explained with reference to FIG. 1, which depicts one embodiment of a topology which may be used to implement embodiments of the systems and methods of the present invention. Additional example topologies can be found in U.S. Pat. No. 9,129,325, issued Sep. 8, 2015, entitled "SYSTEM AND METHOD FOR AGGREGATION, ANALYSIS, PRESENTATION AND MONETIZATION OF PRICING DATA FOR VEHICLES AND OTHER COMMODITIES," U.S. Pat. No. 7,945,483, issued May 17, 2011, entitled "SYSTEM AND METHOD FOR SALES GENERATION IN CONJUNCTION WITH A VEHICLE DATA SYSTEM," and U.S. patent application Ser. No. 15/471,805, filed Mar. 28, 2017, entitled "VEHICLE DATA SYSTEM FOR RULES BASED DETERMINATION AND REAL-TIME DISTRIBUTION OF ENHANCED VEHICLE DATA IN AN ONLINE NETWORKED ENVIRONMENT", each of which is hereby incorporated by reference in its entirety for all purposes.

Topology 100 comprises a set of entities including vehicle data system 120 (also referred to herein as the TrueCar system) which is coupled through network 170 to computing devices 110 (e.g. computer systems, personal data assistants, kiosks, dedicated terminals, mobile telephones, smart phones, etc.,), and one or more computing devices at inventory companies 140, original equipment manufacturers (OEM) 150, sales data companies 160, financial institutions 182, external information sources 184, departments of motor vehicles (DMV) 180 and one or more associated point of sale locations, in this embodiment, computer systems 132 in car dealers 130. Network 170 may be for example, a wireless or wireline communication network such as the Internet or wide area network (WAN), publicly switched telephone network (PSTN) or any other type of electronic or non-electronic communication link such as mail, courier services or the like.

Vehicle data system 120 may comprise one or more computer systems with central processing units executing instructions embodied on one or more computer readable media where the instructions are configured to perform at least some of the functionality associated with embodiments of the present invention. These applications may include a vehicle data application 190 comprising one or more applications (instructions embodied on a computer readable media) configured to implement an interface module 192, data gathering module 194 and processing module 196 utilized by the vehicle data system 120. Furthermore, vehicle data system 120 may include data store 122 operable to store obtained data 124, data 126 determined during operation, models 128 which may comprise a set of dealer cost model or price ratio models, or any other type of data associated with embodiments of the present invention or determined during the implementation of those embodiments. Data store 122 may include a variety of user data, including user behavioral data, vehicle data, dealer data, manufacturer data and other data.

Vehicle data system 120 may provide a wide degree of functionality including utilizing one or more interfaces 192 configured to for example, receive and respond to queries from users at computing devices 110 or dealer computer 132; interface with inventory companies 140, manufacturers 150, sales data companies 160, financial institutions 170, DMVs 180 or dealers 130 to obtain data; or provide data obtained, or determined, by vehicle data system 120 to any of inventory companies 140, manufacturers 150, sales data companies 160, financial institutions 182, DMVs 180, external data sources 184 or dealers 130. It will be understood that the particular interface 192 utilized in a given context may depend on the functionality being implemented by vehicle data system 120, the type of network 170 utilized to communicate with any particular entity, the type of data to be obtained or presented, the time interval at which data is obtained from the entities, the types of systems utilized at the various entities, etc. Thus, these interfaces may include, for example web pages, web services, a data entry or database application to which data can be entered or otherwise accessed by an operator, or almost any other type of interface which it is desired to utilize in a particular context.

In general, then, using these interfaces 192 vehicle data system 120 may obtain data from a variety of sources, including one or more of inventory companies 140, manufacturers 150, sales data companies 160, financial institutions 182, DMVs 180, external data sources 184 or computer systems 132 at dealers 130 and store such data in data store 122. This data may be then grouped, analyzed or otherwise processed by vehicle data system 120 to determine desired data 126 or models 128 which are also stored in data store 122.

A user at computing device 110 may access the vehicle data system 120 through the provided interfaces 192 and specify certain parameters, such as a desired vehicle configuration or incentive data the user wishes to apply, if any. The vehicle data system 120 can select a particular set of data in the data store 122 based on the user specified parameters, process the set of data using processing module 196 and models 128, generate interfaces using interface module 192 using the selected data set and data determined from the processing, and present these interfaces to the user at the user's computing device 110 or through dealer computers 132. More specifically, in one embodiment interfaces 192 may visually present the selected data set to the user in a highly intuitive and useful manner.

Turning to the various other entities in topology 100, dealer 130 (e.g., dealers 130a, 130b . . . 130n) may be a retail outlet for vehicles manufactured by one or more of OEMs 150. To track or otherwise manage sales, finance, parts, service, inventory and back office administration needs dealers 130 may employ a dealer management system (DMS) 132 (e.g., 132a, 132b . . . 132n). Since many DMS 132 are Active Server Pages (ASP) based, transaction data 134 (e.g., 134a, 134b . . . 134n) may be obtained directly from the DMS 132 with a "key" (for example, an ID and Password with set permissions within the DMS system 132)

that enables data to be retrieved from the DMS system 132. Many dealers 130 may also have one or more web sites which may be accessed over network 170, where pricing data pertinent to the dealer 130 may be presented on those web sites, including any pre-determined, or upfront, pricing. This price is typically the "no haggle" (price with no negotiation) price and may be deemed a "fair" price by vehicle data system 120.

Additionally, a dealer's current inventory may be obtained from a DMS 132 and associated with that dealer's information in data store 122. A dealer 130 may also provide one or more upfront prices to operators of vehicle data system 120. Each of these upfront prices may be associated with a vehicle configuration such that a list of vehicle configurations and associated upfront prices may be associated with a dealer in data store 122. This upfront price may, in one embodiment, comprise an offset from an inventory price for the vehicle configuration. It will be noted that an upfront price may be provided at almost any level of granularity desired. For example, a single upfront price may correspond to all vehicles of a particular make sold by the dealer, to all vehicles of a particular make and model sold by the dealer, to all vehicles of a particular make, model and trim sold by the dealer, etc.

Inventory companies 140 may be one or more inventory polling companies, inventory management companies or listing aggregators which may obtain and store inventory data from one or more of dealers 130 (for example, obtaining such data from DMS 132). Inventory polling companies are typically commissioned by the dealer to pull data from a DMS 132 and format the data for use on websites and by other systems. Inventory management companies manually upload inventory information (photos, description, specifications) on behalf of the dealer. Listing aggregators get their data by "scraping" or "spidering" websites that display inventory content and receiving direct feeds from listing websites (for example, Autotrader, FordVehicles.com).

DMVs 180 may collectively include any type of government entity to which a user provides data related to a vehicle. For example, when a user purchases a vehicle, it must be registered with the state (for example, DMV, Secretary of State, etc.) for tax and titling purposes. This data typically includes vehicle attributes (for example, model year, make, model, mileage, etc.) and sales transaction prices for tax purposes. Thus, data obtained 124 from the DMVs 180 may include vehicle registrations from dealers 130, including the dealer (or dealer location) from which a vehicle was purchased, the zip code or address of the user who purchased the vehicle, the date of the sales transaction, etc.

Financial institution 182 may be any entity such as a bank, savings and loan, credit union, etc. that provides any type of financial services to a participant involved in the purchase of a vehicle. For example, when a buyer purchases a vehicle they may utilize a loan from a financial institution, where the loan process usually requires two steps: applying for the loan and contracting the loan. These two steps may utilize vehicle and user information in order for the financial institution to properly assess and understand the risk profile of the loan. Typically, both the loan application and loan agreement include proposed and actual sales prices of the vehicle.

Sales data companies 160 may include any entities that collect any type of vehicle sales data. For example, syndicated sales data companies aggregate new and used sales transaction data from the DMS 132 systems of particular dealers 130. These companies may have formal agreements with dealers 130 that enable them to retrieve data from the dealer 130 in order to syndicate the collected data for the purposes of internal analysis or external purchase of the data by other data companies, dealers, and OEMs.

Manufacturers 150 are those entities which actually build the vehicles sold by dealers 130. In order to guide the pricing of their vehicles, the manufacturers 150 may provide an Invoice price and a Manufacturer's Suggested Retail Price (MSRP) for both vehicles and options for those vehicles—to be used as general guidelines for the dealer's cost and price. These fixed prices are set by the manufacturer and may vary slightly by geographic region.

External information sources 184 may comprise any number of other various sources, online or otherwise, which may provide other types of desired data, for example data regarding vehicles, pricing, demographics, economic conditions, markets, locale(s), users, etc.

It should be noted here that not all of the various entities depicted in topology 100 are necessary, or even desired, in embodiments of the present invention, and that certain of the functionality described with respect to the entities depicted in topology 100 may be combined into a single entity or eliminated altogether. Additionally, in some embodiments other data sources not shown in topology 100 may be utilized. Topology 100 is therefore exemplary only and should in no way be taken as imposing any limitations on embodiments of the present invention.

At certain intervals, vehicle data system 120 may obtain by gathering (for example, using an interface of interface module 192 to receive or request) data from one or more of inventory companies 140, manufacturers 150, sales data companies 160, financial institutions 182, DMVs 180, external data sources 184 or dealers 130. This data may include sales or other historical transaction data for a variety of vehicle configurations, inventory data, registration data, finance data, vehicle data, incentive data and other data.

It should be noted that differing types of data may be obtained at different time intervals, where the time interval utilized in any particular embodiment for a certain type of data may be based, at least in part, on how often that data is updated at the source, how often new data of that type is generated, an agreement between the source of the data and the providers of the vehicle data system 120 or a wide variety of other factors. The data collected from these various data sources distributed across the network may thus be used to enhance or augment previously stored data records, allowing the use of centralized data store or the like, even in cases where the data must be collected at different time intervals from various data sources distributed across a networked computing environment.

Once such data is obtained and stored in data store 122, it may be analyzed and otherwise processed to yield data sets corresponding to particular vehicle configurations (which may include, for example, include vehicle make, model, power train, options, etc.) and geographical areas (national, regional, local, city, state, zip code, county, designated market area (DMA), or any other desired geographical area). It will be understood that although certain geographic areas are used in association with some of the following descriptions in association with particular embodiments (e.g., zip code) almost any desired geographic area may be utilized in other embodiments and the use of a particular geographic area in the description of certain embodiments should not be taken in any way as a limitation generally on other embodiments.

In one embodiment, the obtained data 124 or the determined data 126 may include a zip code or address (or other indicator of geographic location) for each of a set of vehicle dealers 130. These vehicle dealers may be all the dealers in a geographic area (such as nationally), or dealers 130 associated with a particular network of dealers (e.g., True-Car dealer network) or both. Moreover, sales or transaction data associated with vehicle sales at the set of vehicle dealers 130 may also be stored in the obtained data 124. This sales or transaction data may include data on a set of vehicle sales, each vehicle sale corresponding to a vehicle sale of a vehicle make and model occurring at a dealer and may be associated with, for example, a sales price, a buyer's address or location, etc.

According to some embodiments, the obtained data 124 may include historical data which may be obtained from an aggregator or provider of industry data, such as Polk. In such embodiments, the raw historical data may be provided in a tabular format, a portion of which may include data as shown below, where each row represents one transaction.

| Registration Year Month | Make | User Zip code | Dealer Zip code | Dealer Address |
|---|---|---|---|---|
| November 2016 | Toyota | 90024 | 90401 | 120 Broadway 90024 Santa Monica CA |
| . . . | . . . | . . . | . . . | . . . |

Additionally, for every zip code (or other geographic indicator) the centroid (e.g., latitude and longitude) of the zip code may be stored (e.g., in obtained data 124 or determined data 126). In particular, in one embodiment this data may be stored in a lookup table such that the distance from every dealer to any other dealer may be determined or the distance from any dealer to a zip code (e.g., the centroid of a zip code) may be determined.

A vehicle data system may also obtain or determine several pieces of information from site users during signup, sometimes referred to as 'prospecting'. These include full name, street address, phone number, and email address. A collection of such data for a given user is sometimes termed an 'entity', and these can be treated as a single data object or record (e.g., by the vehicle data system). These same components of a user entity can appear on the sales data reported or determined from data obtained from a distributed data source after a sale is finalized, and the vehicle data system collects this data after the fact through a variety of sources.

At some point then, a user at a computing device may access vehicle data system 120 using one or more interfaces 192 such as a set of web pages provided by vehicle data system 120. Using this interface 192 a user may specify a vehicle configuration by defining values for a certain set of vehicle attributes (make, model, trim, power train, options, etc.) or other relevant information such as a geographical location. In the case of a used car, the user may also specify additional attributes, such as mileage or vehicle condition. Using interface 192, the user may also specify a purchase date, or window of purchase dates of interest. The user specified vehicle data may be used to locate one or more components previously determined and stored in a back-end process by the vehicle data system and associated with the specified vehicle configuration or geographic data provided by the user. These components may include one more previously determined models 128. These components may then be utilized to determine and present likelihood of data for the specified vehicle and user specified price in real-time over the network 170 using a generated interface 192.

In particular, data associated with the specified vehicle configuration may be determined and presented to the user in a visual manner. Specifically, in one embodiment, a probability (or likelihood) curve associated with a price range where the probability curve represents the likelihood of prices across a range being accepted may be visually displayed to a user. Other vehicle data may be presented to the user in the visual interface, such as a price curve representing actual transaction data associated with the specified vehicle configuration (which may or may not have been adjusted) or visual references indicating one or more price ranges and one or more reference price points (e.g., invoice price, MSRP, dealer cost, average price paid, dealer cost, internet average, etc.). In some embodiments, these visual indicators may be displayed such that a user can easily determine what percentage of users paid a certain price or the distribution of prices within certain price ranges.

In one embodiment the vehicle data system 120 may include sales matching engine 198. Embodiments of such a sales matching engine may be used to generate potential matching pairs comprising a sale (e.g., data or an object representing that sale) and an associated user (e.g., data or an object representing that sale) of the vehicle data system 120 and an associated confidence score indicating a degree of confidence that the user of the pair participated in the sale of the pair (e.g., purchased the vehicle represented by the sale).

Such a sales matching engine 198 may include a scoring engine to determine the similarity of the user and sales data entities by comparing one or more individual fields within the data or data objects representing the user or sale using a complex set of filtering and comparison rules, which may include the application of one or more machine learning engines. In addition to comparisons between these fields, there are also 'transactional' data fields which can be used to judge the similarity of user activity on the website or other interfaces of the vehicle data system, and a given purchasing user (e.g., at a vehicle dealer).

In some embodiments, sales matching engine 198 may employ a matching engine to identify potential user matches for each sale that occurs (e.g., at affiliated dealers on the distributed network) by using a coarse-grained searching technique that searches for exact matches in one or more data items. The output of the matching engine 530 may thus be a set of user-sale pairs (or user ID-sale ID pairs). The scoring engine can then generate a confidence score for each of these potential matches.

In one embodiment, the vehicle data system may also include a billing engine including billing logic such that each sale and user pair and its associated confidence score produced by the sales matching engine 198 are provided to the billing engine. The billing engine may include a set of rules that can be applied to each sale-user pair to decide if a match should be approved (e.g., for sending an invoice or bill to a dealer). This match decision will generally be made on the basis of a short list of filtering rules based on the confidence score associated with the pair.

Figures 2A, 2B:
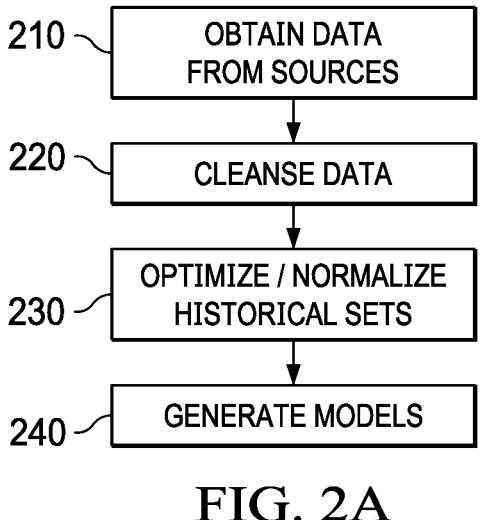
FIGS. 2A and 2B depict one embodiment of a method for determining, utilizing and presenting data in a vehicle data system.

Turning now to FIGS. 2A and 2B, aspects of the operation of a vehicle data system are depicted. Referring first to the embodiment of FIG. 2A, at step 210 data can be obtained from one or more of the data sources (e.g., inventory companies 140, manufacturers 150, sales data companies 160, financial institutions 182, DMVs 180, external data sources 184, used car data sources 186, dealers 130, etc.) coupled to the vehicle data system 120 and the obtained data can be stored in the associated data store 122. In particular, obtaining data may comprise gathering the data by requesting or receiving the data from a data source.

It will be noted with respect to obtaining data from data sources that different data may be obtained from different data sources at different intervals, and that previously obtained data may be archived before new data of the same type is obtained and stored in data store 122. The data collected from these various data sources distributed across the network may thus be used to enhance or augment previously stored data records, allowing the use of centralized data store or the like, even in cases where the data must be collected at different time intervals from various data sources distributed across a networked computing environment.

In certain cases, some of the operators of these data sources may not desire to provide certain types of data, especially when such data includes personal information or certain vehicle information (VIN numbers, license plate numbers, etc.). However, in order to correlate data corresponding to the same person, vehicle, etc. obtained from different data sources and enhance certain data records, it may be desirable to have such information. To address this problem, operators of these data sources may be provided a particular hashing algorithm and key by operators of vehicle data system 120 such that sensitive information in data provided to vehicle data system 120 may be submitted and stored in data store 122 as a hashed value. Because each of the data sources utilizes the same hashing algorithm to hash certain provided data, identical data values will have identical hash values, facilitating matching or correlation between data obtained from different (or the same) data source(s). Thus, the data source operators' concerns can be addressed while simultaneous avoiding adversely impacting the operation of vehicle data system 120.

Once data is obtained and stored in data store 122, the obtained data may be cleansed at step 220. The cleansing of this data may include evaluation of the data to determine if it conforms to known values, falls within certain ranges or is duplicative. When such data is found, it may be removed from the data store 122, the values which are incorrect or fall outside a threshold may be replaced with one or more values (which may be known specifically or be default values), or some other action entirely may be taken.

At step 230, the cleansed data may be optimized, and where appropriate, normalized and used to form sample sets of data. Normalization may include converting historical sales data which is expressed in dollars or other currencies into price ratios comprising the sale price divided by the MSRP, upfront price (UFP) or other reference value. In this way, historical sales data may be normalized. Normalization may also include performing adjustments (e.g., applying one or more adjustment factors) to account for inherent differences in how vehicle prices are reported. The application of such adjustment factors may prevent the differing (or changing) percentages of data coming from each source from impacting the accuracy of results.

Optimization may include grouping data into data sets according to geography (for example, national, regional, local, state, county, zip code, DMA, some other definition of a geographic area, such as within 500 miles of a location, etc.) and optimizing these geographic data sets for a particular vehicle configuration. In the case of used vehicles, the optimization may further comprise grouping data into sets according to mileage, condition or other parameters of particular interest to buyers and sellers of used vehicles. This optimization process may result in one or more data sets corresponding to a particular vehicle or group or type of vehicles, a set of attributes of a vehicle and an associated geography.

In one embodiment, the obtained data or the determined data may include a zip code or address (or other indicator of geographic location) for each of a set of vehicle dealers 130. These vehicle dealers may be all the dealers in a geographic area (such as nationally), or dealers 130 associated with a particular network of dealers (e.g., TrueCar dealer network) or both. Moreover, sales or transaction data associated with vehicle sales at the set of vehicle dealers 130 may also be stored in the obtained data. This sales or transaction data may include data on a set of vehicle sales, each vehicle sale corresponding to a vehicle sale of a vehicle make and model occurring at a dealer and may be associated with, for example, a sales price, a buyer's address or location, a dealer's identifier, etc.

Using the data sets resulting from the optimization process, a set of models may be generated at step 240. These models may include a set of dealer cost models corresponding to one or more of the data sets resulting from the optimization process discussed above. An average price ratio (for example, price paid/dealer cost) model for the data set may also be generated using the obtained data.

These models may also include a predictive model, which may include rules for determining a forecast of the expected market price (expressed in a currency or as a price ratio) of a given vehicle at a specified time. The predictive model may also include rules for providing a forecast of the vehicle's market price in a particular locality, or nationally.

These models may include a likelihood model that includes a set of rules for determining a probability of the acceptance of a particular price (e.g., including a price range) by a seller of a vehicle given a set of parameters associated with the vehicle (e.g., year, make, model, geographic locale, etc.) or time period of purchase. In particular, in certain embodiments, this likelihood model may relate the price of vehicle sales to attributes of the sale transaction such that by providing values for those attributes from sales transactions to the likelihood model an expected price (or price ratio) at which a vehicle will sell may be determined along with one or more standard deviations or confidence intervals associated with the expected price. In one embodiment, for example, the likelihood model includes one or more rules for generating a cumulative distribution function for a set of completed historical vehicle transactions.

The models may also include a low volume model to account for cases involving rare cars or other cases where the volume of data is insufficient to generate or obtain meaningful results by applying the one or more of the models. For example, a low volume likelihood model may be included to generate a likelihood function where the volume of data is insufficient to generate or obtain meaningful results by applying the likelihood model. It will be noted that these models may be updated at certain intervals, where the interval at which each of the dealer cost models, average price ratio model, predictive model or likelihood model is generated may, or may not, be related to the intervals at which data is obtained from the various data sources or the rate at which the other model(s) are generated.

Moving on to the portion of the embodiment depicted in FIG. 2B, at step 250 the vehicle data system 120 may receive a specific vehicle configuration through a provided interface 192. In one embodiment, for example, a user at a web page provided by vehicle data system 120 may select a particular vehicle configuration using one or more menus or may navigate through a set of web pages to provide the specific vehicle configuration and specified price (e.g., at which the user wishes to purchase the vehicle). This specified vehicle configuration may comprise values for a set of attributes of a desired vehicle such as a make, model, trim level, one or more options, etc. The user may also specify a geographic locale where he is located or where he intends to purchase or sell a vehicle of the provided specification. At step 255, the user may also specify a purchase date or a range of purchase dates of interest.

Other information which a user may provide includes incentive data pertaining to the specified vehicle configuration. In one embodiment, when a user specifies a particular vehicle configuration the vehicle data system 120 will present the user with a set of incentives associated with the specified vehicle configuration if any are available. The user may select zero or more of these incentives to apply.

Pricing data associated with the specified vehicle configuration may then be determined by the vehicle data system 120 at step 260. This data may include adjusted transaction prices, mean, median, and probability distributions for pricing data associated with the specified vehicle configuration within certain geographical areas (including, for example, the geographic locale specified); calculating a set of quantifiable price points or ranges (e.g. "average," "good," "great," "overpriced," etc. prices or price ranges); determining historical price trends or pricing forecasts; or determining any other type of desired data. In one embodiment, the data associated with the specified vehicle configuration may be determined using the price ratio model, likelihood model or historical transaction data associated with the specified vehicle configuration as will be discussed.

In one embodiment, the data may be selected using predetermined control logic to ensure a proper sample size. In some embodiments, the control logic may comprise a fallback binning logic, wherein the historical data may be grouped into a series of "bins" of historical sales data, and a data set is determined by choosing the bin of historical sales data for transactions most analogous (such as in terms of vehicle trim level, or proximity in time or location) to the parameters specified by the user at steps 250 or 255.

In a particular embodiment, the pricing data selected may be associated with one or more selected dealers within the geographic area specified by the user, where the dealer has offered an upfront price for a vehicle similar to the specified vehicle configuration and has completed one or more transactions for a vehicle similar to the specified vehicle. In one embodiment, the set of dealers (e.g., within a geographic area of the user) may be scored. The dealer scores associated with the dealers that are within the geographic area of the user may be used to select a set of dealers (e.g., the top five with the highest (or lowest) scores) and pricing data associated with the selected dealers may be selected as the pricing data to utilize. Embodiments of such dealer scoring is discussed in U.S. Pat. No. 8,868,480, issued on Oct. 21, 2014, to McBride et al, which is hereby incorporated herein by reference for all purposes.

Using data from the selected bin of historical data, vehicle data for presentation may be determined at step 264. This vehicle data may include, for example, a pricing data, including a probability or probability distribution (collectively probability or likelihood) that a purchase price will be accepted using price ratios determined from the set of historical data. In particular, a set of rules defining a likelihood model may be applied to the historical transaction data to determine the probability that the vehicle price provided by the user through the interface will be accepted by a dealer using a price ratio determined for dealers of the vehicle of the specified vehicle configuration based on, for example, historical price ratios determined for the vehicle of the specific configuration, a known price ratio acceptable for a dealer (e.g., based on an upfront price provided for the vehicle by the dealer) or other methods of determining price ratios acceptable to the dealer for the vehicle of interest.

An interface for presentation of the determined pricing data associated with the specified vehicle configuration may then be generated at step 270. These interfaces may comprise a visual presentation of such data using, for example, bar charts, histograms, curves with indicators of certain price points, graphs with trend lines indicating historical trends or price forecasts, or any other desired format for the visual presentation of data. In particular, in one embodiment, the determined probability may be displayed as a probability distribution curve representing a probability on one axis with a price range on the other axis.

In some embodiments, there may be visual indicators on or under the curve which indicate determined price points or ranges, such as one or more quantifiable prices or one or more reference price points (for example, invoice price, MSRP, dealer cost, market average price paid, dealer cost, internet average, etc.). Thus, using an embodiment of such an interface a user can easily determine the probability of having an offered or desired price accepted by a dealer, along with the effect of increasing or lowering an offered price. It should be noted here that though the interfaces elaborated on with respect to the presentation of data to a user in conjunction with certain embodiments are visual interfaces, other interfaces which employ audio, tactile, some combination, or other methods entirely may be used in other embodiments to present such data.

The interfaces may be distributed through a variety of channels at step 280. The channels may comprise a user facing network based application (for example, a set of web pages provided by vehicle data system 120 which a user may access over a network at a computing device such as a computer or mobile phone and which are tailored to the desires of, or use by, users); a dealer facing network based application (a set of web pages provided by the vehicle data system 120 which are tailored to the desires of, or use by, dealers); text or multimedia messaging services; widgets for use in web sites or in other application setting, such as mobile phone applications; voice applications accessible through a phone; or almost any other channel desired. It should be noted that the channels described here, and elsewhere, within this disclosure in conjunction with the distribution of data may also be used to receive data (for example, a user specified vehicle configuration or the like), and that the same or some combination of different channels may be used both to receive data and distribute data.

As may be apparent from a review of the above discussion, embodiments of vehicle data system 120 may entail a number of processes occurring substantially simultaneously or at different intervals and that many computing devices 110 may desire to access vehicle data system 120 at any given point. Accordingly, in some embodiments, vehicle data system 120 may be implemented utilizing an architecture or infrastructure that facilitates cost reduction, performance, fault tolerance, efficiency and scalability of the vehicle data system 120.

Figure 3:
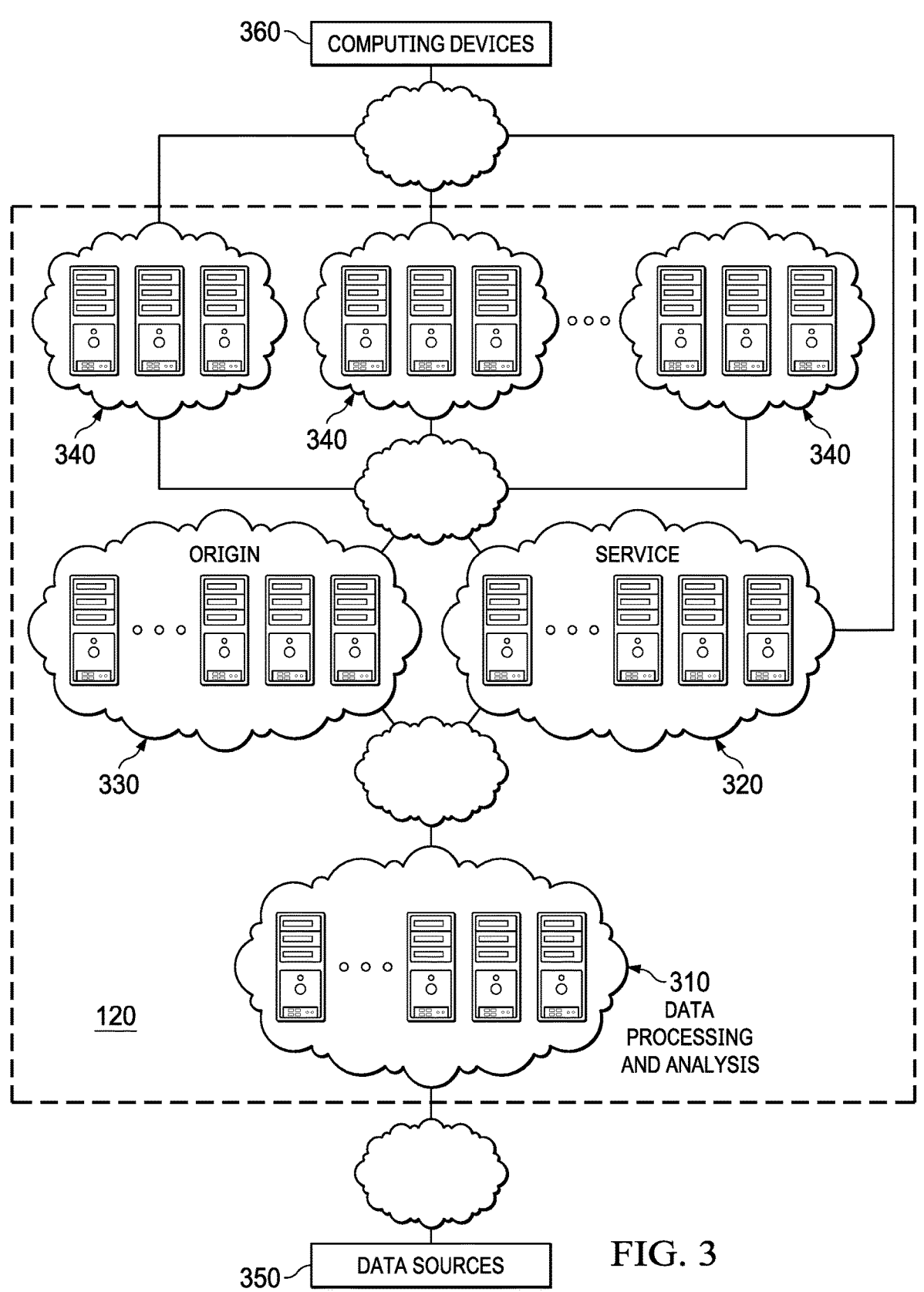
FIG. 3 depicts one embodiment of an architecture for a vehicle data system.

One embodiment of such an architecture is depicted in FIG. 3. Specifically, one embodiment of vehicle data system 120 may be operable to provide a network based interface including a set of web pages accessible over the network, including web pages where a user can specify a desired vehicle configuration and receive pricing data corresponding to the specified vehicle configuration. Such a vehicle data system 120 may be implemented utilizing a content delivery network (CDN) comprising data processing and analysis servers 310, services servers 320, origin servers 330 and server farms 340 distributed across one or more networks, where servers in each of data processing and analysis servers 310, services servers 320, origin servers 330 and server farms 340 may be deployed in multiple locations using multiple network backbones or networks where the servers may be load balanced.

The vehicle data system may include a back-end comprising data processing and analysis servers 320 which may interact with one or more data sources 350 (examples of which are discussed above) to obtain data from these data sources 350 at certain time intervals (for example, daily, weekly, hourly, at some ad-hoc variable interval, etc.) and process this obtained data as discussed both above in more detail later herein. This processing includes, for example, the cleansing of the obtained data, determining and optimizing sample sets, the generation of models, etc.

The back-end may also include origin servers 330 which may populate a web cache at each of server farms 340 with content for the provisioning of the web pages of the interface to users at computing devices 360 (examples of which are discussed above). Server farms 340 may provide the set of web pages to users at computing devices 110 using web caches at each server farm 340. More specifically, users at computing devices 360 connect over the network to a particular server farm 340 such that the user can interact with the web pages to submit and receive data through the provided web pages. In association with a user's use of these web pages, user requests for content may be algorithmically directed to a particular server farm 340. For example, when optimizing for performance locations for serving content to the user may be selected by choosing locations that are the fewest hops, the fewest number of network seconds away from the requesting client or the highest availability in terms of server performance (both current and historical), so as to optimize delivery across the network.

Certain of the web pages or other interfaces provided by vehicle data system 120 may allow a user to request services, interfaces or data which cannot be provided by server farms 340, such as requests for data which is not stored in the web cache of server farms 340 or analytics not implemented in server farms 340. User requests which cannot be serviced by server farm 340 may be routed to one of service servers 330. These requests may include requests for complex services which may be implemented by service servers 330, in some cases utilizing the data obtained or determined using data processing and analysis servers 310.

As has been discussed, a vehicle data system may collect several pieces of information from site users during signup, sometimes referred to as 'prospecting'. These include full name, street address, phone number, and email address. A collection of such data for a given user is sometimes termed an 'entity', and these can be treated as a single data object or record (e.g., at the vehicle data system). These same components of a user entity can appear on the sales data reported or determined from data obtained from a distributed data source after a sale is finalized, and the vehicle data system collects this data after the fact through a variety of sources.

The below table gives examples of data that may be included in such an entity (e.g., an entity representing a user of a vehicle data system or a sale). Note that each sale or user may be identified by a unique identifier string that does not itself include any PII or confidential information.

| Category | Field | Example |
|---|---|---|
| ID | Unique Identifier for Sale or User | 0x8964fd29b12ad297f6e6b5318b2903c752609d4b |
| Name | First | John |
| | Last | Smith |
| Address | Street Number | 120 |
| | Street Name | Broadway |
| | Apartment Number | 200 |
| | City | Santa Monica |
| | State | CA |
| | Zip Code | 90401 |
| Phone | Full Number | 310-555-1234 |
| Email | Full Email | john.smith@truecar.com |

Figure 4:
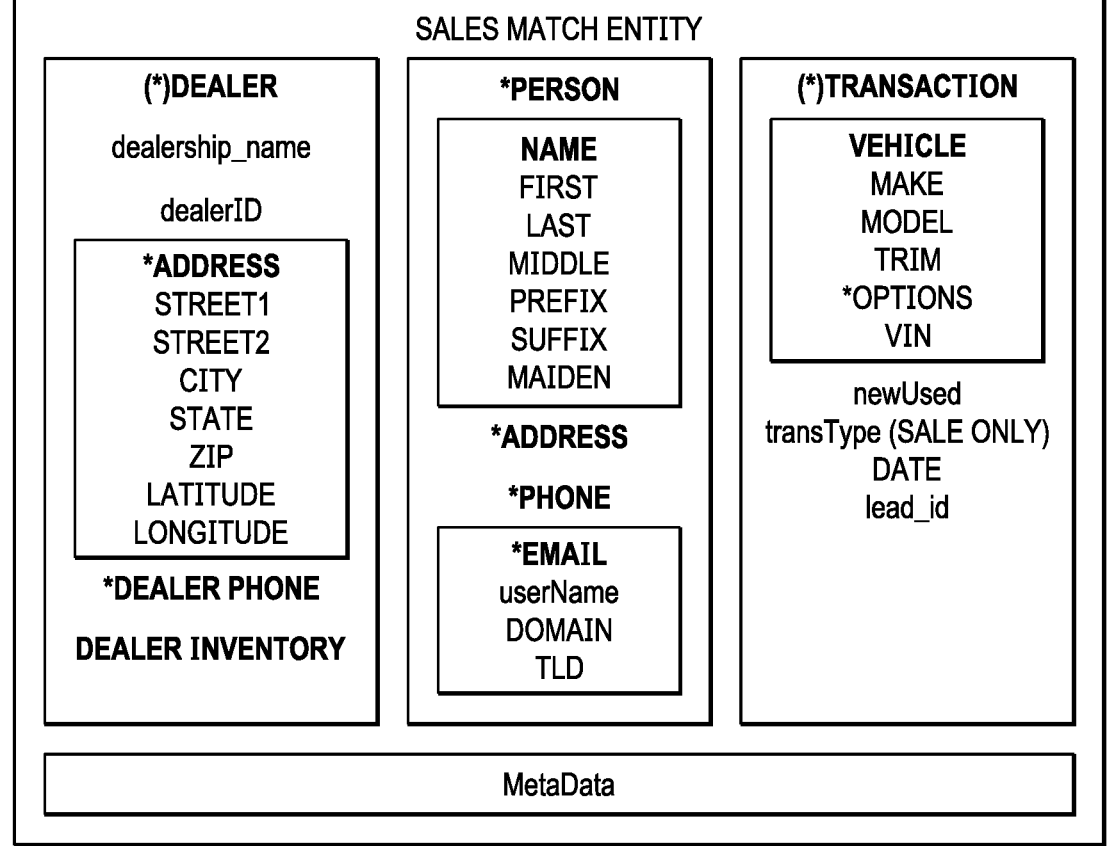
FIG. 4 is a block diagram graphically depicting one embodiment of a Sales Matching Entity (SME) data object.

Similarly, FIG. 4 is a block diagram graphically depicting one embodiment of a data object (e.g., referred to herein as a Sales Matching Entity (SME) data object without loss of generality) that may be used (e.g., by a vehicle data system) to store data for a user record (e.g., a user SME or user SME object) or a sale record (e.g., a sale SME of sale SME object) that may be determined from data obtained from a data source within the distributed network. With respect to the depiction of FIG. 4, the hierarchical structure of a SME data object that is used to store data for both sales and user record for a vehicle data system is depicted.

In FIG. 4, the nesting of blocks show how the various attributes are grouped together while asterisks denote items that may have multiple entries in the object, and therefore may have multiple scores computed for an SME data object pair, a phenomenon that is referred to as multiplicity and is described in more detail below. For example, for an SME object, there may be multiple dealers, people or transactions. For each dealer there may be one or more addresses or phone numbers, for each person there may be an associated name, multiple addresses, phone numbers or emails. There may be multiple transactions for each SME object, each transaction associated with a vehicle (e.g., including data such as make, model, trim, multiple options, VIN, etc.) and other associated data.

Embodiments of a matching engine as depicted herein may attempt to determine the similarity of the user and sale data entities, by comparing individual fields within these data objects (e.g., SME data objects). In certain instances, exact matches within PII categories have been leveraged to determine match quality using a custom-built scoring system, with weightings determined using analyst expertise rather than any type of rigorous mathematical methods. While sales matching may be accomplished in this manner, because this methodology cannot account for all possible combinations of matching input PII, sale-user pairs that are suspected to be approvable but do not meet the threshold for automatic approval may be passed along to a (e.g., human) analyst for manual review. These manual review cases may constitute about 2% of sales, and are often made on the basis of address normalization and verification, or examining name commonality to make a qualitative estimate of user-sale match confidence. The collective history of these sales made under such an automated system and the manual review system constitute a large set of confirmed sales (~3 million) and associated PII data. This may be inefficient in the context of many vehicle data systems, including those that operate in a distributed network environment that may desire to operate in real-time.

Accordingly, embodiments of scoring engines employed by vehicle data systems may determine the similarity of the user and sales data entities by comparing one or more individual fields within these data objects using a complex set of filtering and comparison rules, which may include the application of one or more machine learning engines. In addition to comparisons between these primary PII fields, there are also 'transactional' data fields which can be used to judge the similarity of user activity on the website or other interfaces of the vehicle data system, and a given purchasing user (e.g., at a vehicle dealer). These include the length of time between a user's interaction with the vehicle data system website and the date of sale for a vehicle, the geographical distance (which can be converted to drive distance or drive time) between a user's home and the dealer's location, and structural details of the purchased vehicle, compared to the vehicles which a user viewed on vehicle data system's site. The table below depicts some examples of such structural data:

| Category | Calculated Field | Example |
|---|---|---|
| Time to Sale | Days between sale and user access to vehicle data system or lead submission | 3 days |
| Drive Distance | Drive distance from user postal code to dealer address | 4.5 miles |
| Structural Similarity | Score based on similarity between purchased vehicle make-model-trim-year and make-model-trim-year of browsed vehicles on the vehicle data system's site | User: {['Honda', 'Civic', 'LX', 2018], ['Toyota, 'Corolla', 'LE',2018]} Sale:{['Toyota, 'Corolla', 'XLE', 2018]} |

Figure 5:
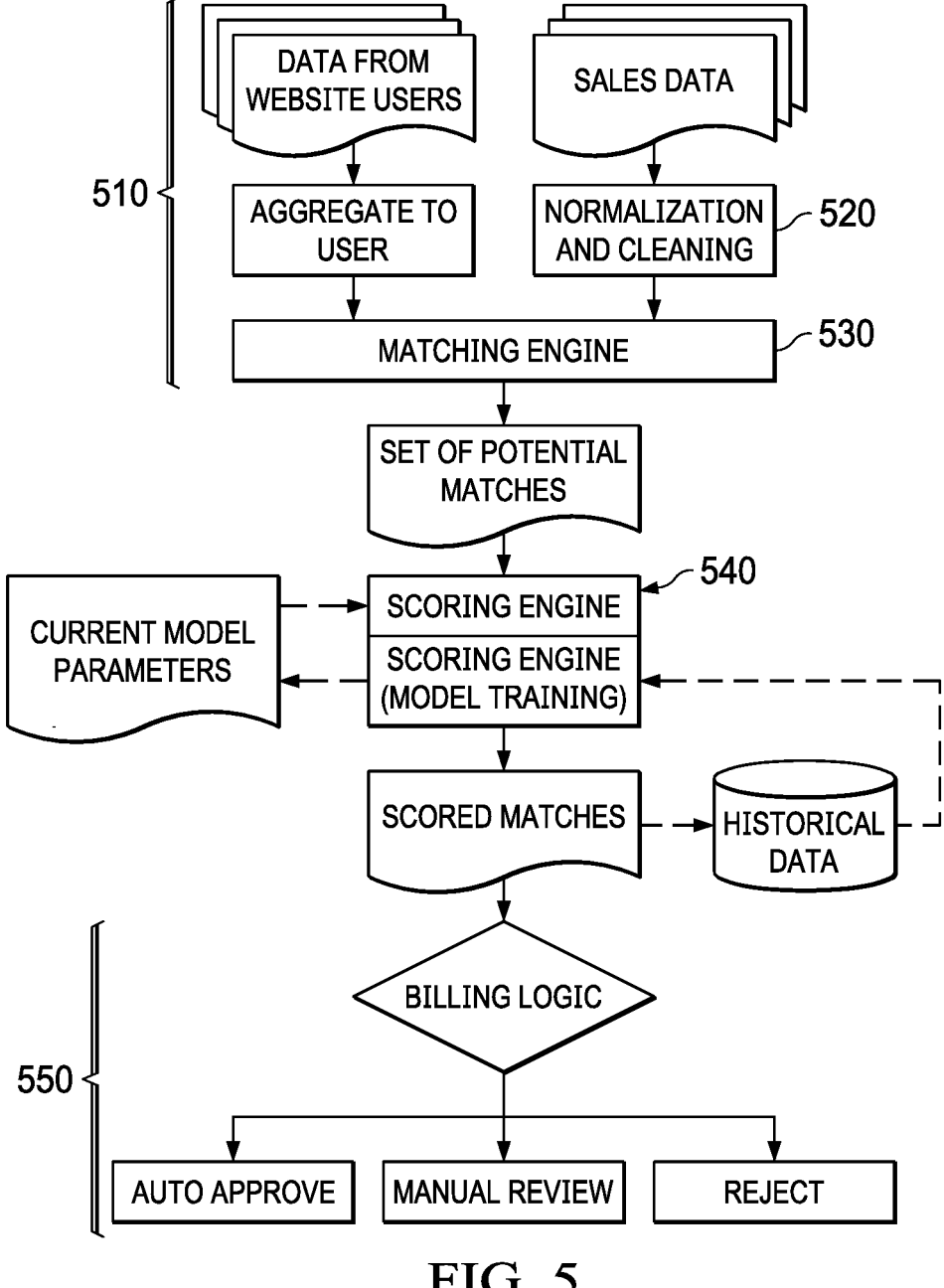
FIG. 5 is a block diagram of one embodiment for sales matching including a scoring engine that may be employed by a vehicle data system.

Turning now to FIG. 5, a block diagram for one embodiment for a sales matching engine including a scoring engine that may be employed by a vehicle data system is depicted. Specifically, FIG. 5 provides an embodiment of an architecture for a sales matching engine based on historical data, using machine learning techniques to identify sales. A high level overview of the architecture including the sales matching engine is explained in the following table:

| Section | Name | Purpose |
|---|---|---|
| 510 | Data Moving | Retrieve data from data store (e.g., Dealer Management Service (DMS)) files as obtained |
| 520 | Data Preparation | Data normalization, enrichment, and ingestion |
| 530 | Matching Engine | Generate filtered sales using a coarse search of (e.g., PII) items. |
| 540 | Scoring Engine | Provide scores for filtered sales |
| 550 | Billing Engine | Billing decisions for scored sales |

In more detail then, in data moving 510, the first step of the sales matching process is to collect the user and sales data that will be used in the comparison. User data for users of the vehicle data system's website is stored in a database structure. For example, sales data is retrieved from a number of Dealer Management Service (DMS) files that the vehicle data system receives from dealerships as discussed above. This data may be stored in SME objects at the vehicle data system as discussed.

In data preparation 520, normalization or cleansing of data (e.g., as discussed above) may be performed. In particular, the scoring engine or matching engine components may utilize comparisons between common formats within user and sale file (e.g., the SME). Data preparation 520 divides the freeform text or other data of each PII entry into a number of subfields. Not all subfields may be used and information may be present in more than one subfield (e.g., first name can appear in both the first_name and full_name subfields).

Moreover, a number of operations for data cleaning are performed for all, or a subset of, subfields. These may include standardization techniques such as converting alphabet characters to lowercase; converting Unicode characters to the closest ASCII equivalent; dropping Unicode characters that cannot be converted through simple substitution; or removing numeric and punctuation characters from fields where these are not expected.

Other normalizing or cleansing operation may include:

a. Name—Numbers and punctuation characters are removed if present. Known prefixes (such as Mr. and Mrs.) and suffixes (Sr., Jr., III, etc.) are identified and removed. The names entry (fullname) is divided (tokenized) into first and last names. If three names are present after tokenization, then the second is assumed to be a middle name. If more than three tokens are present, then the first and last are assumed to correspond to first and last name. The untokenized fullname also comprises an extracted field.

b. Address—Addresses may be standardized (e.g., using a third party service). Fields that are extracted include apartment number, street name, street number, street prefix and suffix, city, state, and zip code.

c. Phone—The phone number is expected to be 10 digits. The international code, if present, is discarded and not used. Subfields extracted include full number, area code, and the 7 digit local number.

d. Email—Email addresses must contain an '@' symbol with character before and after. Those before the '@' are pulled into the user subfield. Those after are expected to form a valid domain name, and are pulled into the domain subfield.

If one of the above subfields cannot be parsed, it may be generally left blank for the subsequent analyses, removing it from consideration during matching and scoring. The entity as a whole, however, can still be compared. There are other ancillary pieces of information that may be used for matching purposes. These include the list of VINs for which the user submitted leads, compared to the sold VINs, the dates on which the user submitted leads, compared to the sale date, and the zip codes of the user and selling dealership, from which approximate drive distance and travel time can be calculated.

Matching engine 530 may be used to identify potential user matches for each sale that occurs (e.g., at affiliated dealers on the distributed network), by using a coarse-grained searching technique that searches for exact matches in one or more PII items. The output of the matching engine 530 may thus be a set of user-sale pairs (or user ID-sale ID pairs). Many of these sales are not linked to users of the vehicle data system, and the matching engine may not be able to find any potential matches, or will only find matches on common items such as first name. Other sales may have multiple potential user matches. Spurious matches, such as a chance overlap in first name, will be processed and discarded by the scoring engine. If multiple matches for the same sale occur in the matching engine, the determination of which, if any, of these may be attributable to a dealer (e.g., and thus billable) may be handled by scoring engine 540.

Below is one set of possible matching rules that may be used in the matching engine 530. A match on any of these data items will add the sale-user pair to the list of pairs to be sent to the scoring engine 540.

e. Address Group—address street AND address state AND (address city OR address zip)

f. Zip code g. First name h. Last name i. First/Last name (e.g., from same source)

j. Fuzzy First and Last Name—edit distance of 1 if 5 characters or less, edit distance of 2 if 10 characters or more k. Phone number l. E-mail address m. E-mail local part n. Fuzzy Email local part—edit distance of 1 if 5 characters or less, edit distance of 2 if 10 characters or more o. Lead VIN=Sale VIN (e.g., in the case of used car only)

Because there may be no upper limit to the number of matches per sale that can potentially be returned, the matching engine 530 may include a cap to this number, and determine a ranking of the strength of coarse matches via a linear weighting system on individual match item that is inferred from historical data. A match solely on email address, for instance, would be ranked higher than a match solely on first name or on zip code. If a sale includes more than the maximum number of coarse matches (e.g., N=50 by default) then only the top N matches will be forwarded to the Scoring Engine. In practice, almost all approved sales originate from the top five ranked matches, so the system may not be sensitive to this setting.

The set of user-sale pairs generated by the matching engine 530 may be provided to the scoring engine 540. The scoring engine 540 may consider all, or a subset, of data about a user-sale pair, and returns a score for that user-sale pairing that can be used to make billing decisions about a particular sale. Whereas the matching engine 530 may be based, for example, on simple string comparisons between subfields in user and sale data (e.g., in their respective SMEs), the scoring engine 540 may use supervised machine learning techniques to consider all data for a pair, and allows nonlinear and 'fuzzy' comparisons.

The output of the scoring engine 540 is a list of (e.g., all or a subset of) the sale ID-user ID pairs that were identified and forwarded as possible matches by the matching engine 530, together with an output confidence score. These scores may be normalized such that a score of greater than 0 indicates a level of confidence that would historically be associated with an approved sale, while a score of less than zero would not normally be approved.

In one embodiment, the vehicle data system may include billing engine 550 including billing logic such that each sale ID-user ID pair and its associated score produced by the scoring engine 540 are provided to the billing engine 550. The billing engine 550 may include a set of rules that can be applied to each sale ID-user ID pair to decide if a match should be approved (e.g., for sending an invoice or bill to a dealer). This match decision will generally be made on the basis of a short list of filtering rules based on the confidence score associated with the pair. These rules may include such rules as: "does the confidence score for the sale suggest automatic approval, manual review, or rejection?;" "Is the dealer an active partner dealership?"; "Does a sale meet the contractual requirements for approval, such as date range?";

"Are there other would or would not be approvable?" (often these are due to dealer-specific agreements with operators of the vehicle data system) or other rules.

Figure 6:
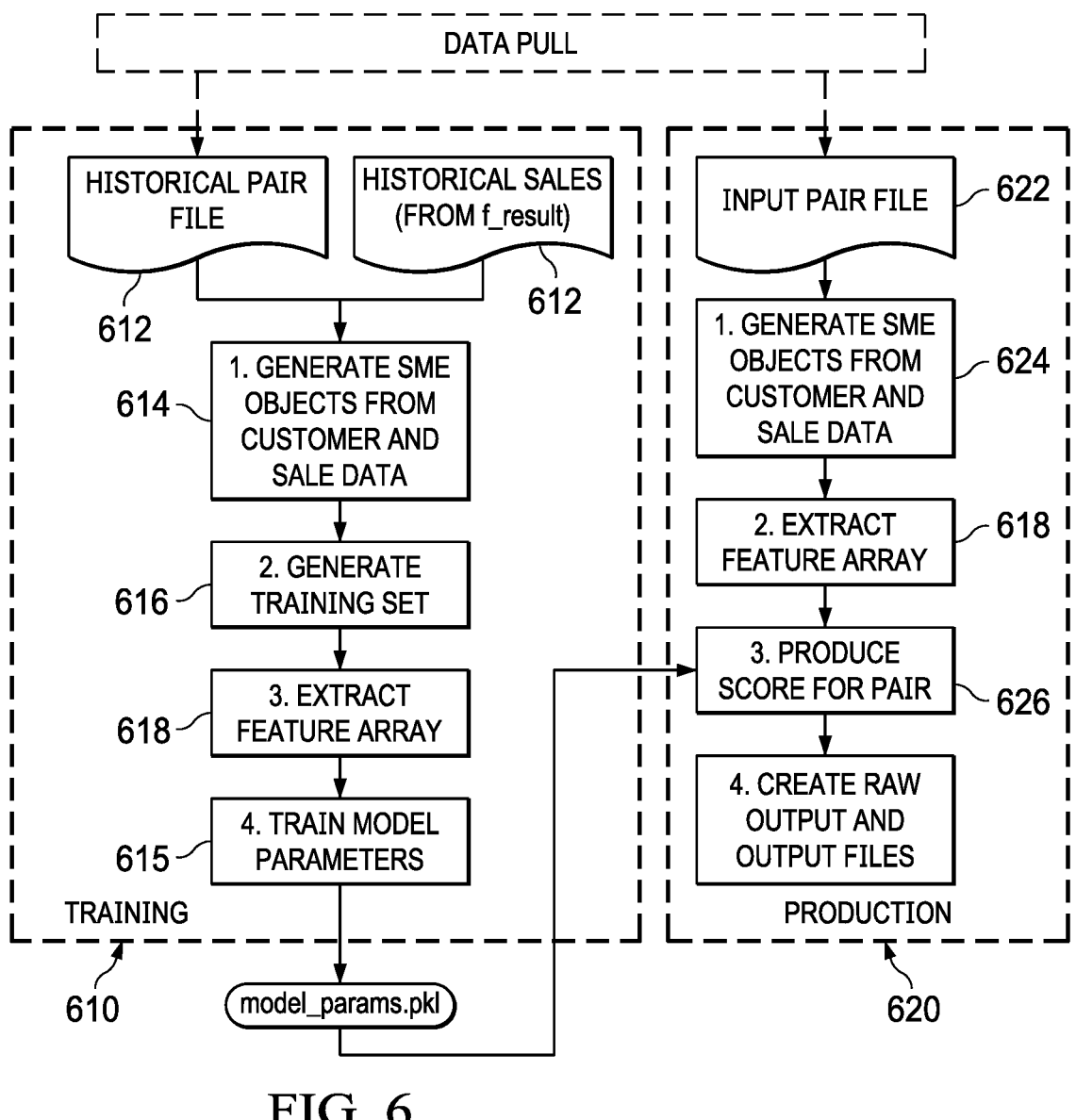
FIG. 6 is a block diagram of one embodiment of the operation of a scoring engine.

It will now be useful to an understanding of embodiments disclosed herein to discuss one embodiment of a scoring engine in more detail. Referring then to FIG. 6, a block diagram of one embodiment of the operation of a scoring engine is depicted. Here, scoring engine 600 may have two modes of operation: training and production (e.g., real-time application in a vehicle data system). In the training mode 610, historical examples of sales are used to create the model parameters (e.g., that may be stored in a file such as "model_params.pkl" in FIG. 6) that is used as an input for the scoring algorithm. In production mode 620, new user-sale pairs (e.g., potential matches such as those generated by the matching engine as discussed above) are scored using the weights from the model parameters, to produce an output file containing IDs for each pair and the confidence score. The two modes may be substantially similar in several areas.

In this embodiment, the training pipeline 610 begins by pulling historical sale and user records from a database on the vehicle data system (e.g., an Apache Phoenix database) 612 to generate a training set 616. Internally, the data for each record may be represented as a single object called an SME as discussed (e.g., sales SME objects and user SME objects) 614. For example, a large sample (500 K-1 M) of each kind of record may be selected at random. To generate known historical sales, a database containing sales history (e.g., here called "f_result") associated with the vehicle data system is queried, and the ID pairs for known sales (e.g., known matches of users and sales) are pulled from these records.

In other words, these may be pairs of sales and users that have been confirmed as being associated (e.g., where the user is definitively known to have participated in the sale). The corresponding records for these IDs that exist in the data sample therefore form a set of known sales. Moreover, the proportion of these sales that were discovered through manual review may be a controllable parameter in training, set to 0.2 by default. Non-sales (i.e. negative cases) may be formed by randomly sampling and pairing together user and sale IDs that do not appear in f_result (e.g., this may be done without replacement). While there is a chance that the PII in such a pair could form an approvable sale, the probability of this happening due to random chance may vanishingly small and will not usually affect training of the scoring engine.

In certain embodiments, a typical target size for the training file is around 20,000 record pairs (e.g., a paring between a user ID and a sale ID) though other sizes may be utilized without loss of generality. As an example, those 20,000 record pairs may be distributed as outlined in the table below:

| Pair Type | Count |
|---|---|
| Known historical sale (auto-approval) | 8000 |
| Known historical sale (manual approval) | 2000 |
| Non-sale | 10000 |

Computationally, then, the flow for generating a training sample may be as follows in one embodiment. First, select (e.g., 500,000) sale and user records from historical data. All possible pairing of these records compose the historical ID pair set. Next, select the set of user-sale IDs for all previously approved sales, and divide into those user-sale ID pairs that are manual approvals and those that are auto-approvals. These sets are the manual and auto-approved result pair set. Some (usually a small fraction) of the pairs in the historical ID set will also appear in the manual or auto-approved result set. Randomly select 2,000 and 8,000 (for example) of these, respectively (e.g., 2,000 of the manual approved result set and 8000 of the auto approved result set) without replacement to be positive cases in the training set.

Now, 10,000 of the other pairs in the historical ID pair set can be selected to be negative cases in the training set. By selecting a relatively large number of manually reviewed pairs those cases may represent a relatively larger number of pairs in the training data relative to their occurrence in operation of the vehicle data system. This ability to over-weight manual review cases may be utilized to increase the decision-making ability of the scoring engine in borderline cases, or cases with an unusual combination of features. While these unclear cases may be a minority of overall sales decisions, they are the types of cases that are frequently sent to manual review.

The pairs (e.g., pairs of user ID to sale ID, or pairs of SME objects) that are part of the training file are passed along to the feature extraction module 618. Feature extraction ("feax") refers to the process of converting each User-Sale pair of data objects into an array (that may be referred to as a feature array) representing matches (or degrees of matching) between the corresponding subfields of the data objects (e.g., SME object) of the pair. Feature extraction may operate substantially identically in training and production modes. The feature array for the set of pairs of the training data can then be passed to the parameter training module to extract the model parameters 615 (e.g., stored in a "model_params.pkl" file as depicted in FIG. 6) that is used as an input for scoring in the production mode.

In production mode 620, the scoring engine receives a list of associated user and sale IDs (e.g., user ID-sale ID pairs) from the matching engine 622. Using these IDs as keys, the system accesses the PII data for each user or sale, and constructs the SME object for the corresponding user and sale such that the pair can be more efficiently scored 624. The list of associated user and dale SMEs are passed along to the feature extraction module 618.

It will now be useful to discuss the details of the feature extraction module. Again, feature extraction ("feax") refers to the process of converting a user-dale pair of data objects into an array representing matches between the corresponding subfields and may operate substantially identically in training and production. Feature extraction on a pair of user and sale data can be represented as follows.

feax(sales_data, user_data)→[1, 0, 0, 1, 0.6, 1, 0.125, 0, 0, . . . ]

Specifically, the value for each entry in the array corresponding to a pair of user-sales identifiers come from a comparison of corresponding values in their respective SME objects. A comparison between corresponding values may be performed by a feature extraction function, where that feature extraction function may (or may not) be specific to that particular feature (e.g., data item or field). In general, the extraction function for each entry in the array falls into one of three categories:

1) Exact match between corresponding items that returns 0 (no match) or 1 (perfect match); 2) a fuzzy match that returns a score between 0 and 1, with higher value indicating a shorter edit distance between the two strings; and 3) a specialized empirical function based on analysis of historical data. An example would be the historical close rates for sales as a function of drive distance between the user zip and dealer location. This monotonically decreasing function, which can be inferred from historical sales data, could also, for example, be used as an additional piece of evidence by the decision algorithm alongside the usual PII data.

In certain embodiments, elements in the feature array may always have values between 0 and 1 (inclusive), with a higher value indicating a higher quality of match between the corresponding data fields. Each module may include as part of its structure an array of string feature names. This array is accessed during the feature extraction step. In this way, "requests" for the array of required features may be "requested" from the feax function.

Now that embodiments of feature extraction have been elaborated upon, reference is now made back to the application of the model parameters to a pair to produce a score for the pair in the scoring engine 626. Specifically, the scoring function takes a feature instance array for a pair and returns a numerical score, or in the case of training, returns a file with the model specifications. This function may employ machine learning techniques integrated with the engine using a "wrapper" that integrates the machine learning code into the rest of the pipeline of the scoring engine. The wrapper is intended to be modular, and can accept any machine-learning module that conforms to a few basic standards.

Specifically, in certain embodiments, the machine learning module should provide a prediction function that accepts a numeric array of length N representing a feature instance array and a specification of model parameters, and returns a numeric score. The machine learning module should have a training function that accepts an M×N array of feature records (M records, each with N features), and a length M array of labels, and returns a specification of model parameters.

The wrapper in the module includes a publicly-readable feature list of length N that can be read by the feature extraction module. The module also accepts a normalization value, which along with the parameter file, defines a model that is normalized to 0, with higher values in the return variable indicating acceptance and lower values rejection. Finally, the wrapper may also add a string to each output value that can be used for debugging and analysis. This string can be determined by the feature array values and may indicate, for instance, feature parameters and weights, or secondary outputs from the machine learning model.

Thus, scores that are output by the scoring engine are linked to one pair of user and sale IDs. As mentioned elsewhere, if multiple scores are associated to the same pair, then the highest score is taken. The final product produced by the scoring engine may be a file having entries of the format:

User ID, Sale ID, Confidence Score, Optional Notes

Here 'Confidence Score' is a numeric value normalized such that values >0 denote a sale similar to historic approvals, and those <0 are most similar to previous rejections.

As will be noticed, features correspond to (e.g., are built from) individual pieces or data fields (e.g., of PII) contained within sale and user records. A complicating factor in deriving features, and by extension the pair score, is the fact that records may have more than one entry for certain subfields. For example, a sale record may have two co-buyers, and each of these co-buyers may have multiple phone numbers, email addresses, etc. Only some of this information may be found for the corresponding user record. This problem is referred to as 'multiplicity', and in one embodiment, the solution is to put extracted features into a data structure that allows different possible combinations of features to be easily compared and scored.

To further understand this issue, an example of the list of features that can be extracted for a production model can be examined:

'person;( );name;first_name-exact',
'person;( );name;first_name-first1-exact', #first initial
'person;( );name;last_name-exact',
'person;( );name;full_name-lev_fuzzy',
'person;( );name;first_last_name-exact_swap',
'person;( );address;( );zip5-exact',
'person;( );address;( );address1-exact',
'person;( );address;( );address1comb-exact',
'person;( );address;( );address1-lev_fuzzy',
'person;( );address;( );numbercomb-exact',
'person;( );address;( );street-exact',
'person;( );address;( );primary_number-exact',
'person;( );address;( );secondary_number-exact',
'person;( );address;( );street_pre_dir-exact',
'person;( );address;( );street_post_dir-exact',
'person;( );address;( );street_suffix-exact',
'person;( );address;( );city-exact',
'person;( );address;( );state-exact',
'person;( );email;( );email_user-exact',
'person;( );email;( );email_domain-exact',
'person;( );email;( );full_email-lev_fuzzy',
'person;( );email;( );full_email-exact',
'person;( );phone;( );full_number-exact',
'person;( );phone;( );local_number-exact',
'person;( );phone;( );area_code-exact',
'transaction;date_separation-weight',
'transaction;new_used-exact',
'transaction; vehicle; make-exact',
'transaction;vehicle;model-exact'

Note that there are (at least) two ways to describe the location of a feature: the human-readable string, and the index within this list of features. The former can also be thought of as the location of the feature in a hierarchical (e.g., tree-like) structure. The rightmost field of the semi-colon-delimited string contains a descriptive name of the feature, while those to the left are the 'coordinates' of the feature within the tree representation.

Places where multiplicity may arise in the data entities (e.g., SMEs) are denoted by empty parentheses '( )'. The feature extraction module works by filling in these parentheses with tuples representing the coordinates of the different entries that exist for a particular feature. For instance, if the user record with name 'John Smith' were paired with a sale record containing the names 'John Smith' and 'Mary Smith', then the resulting feature tree would look like:

person;(0,0);name;first_name-exact=1
person;(0,0);name;first_name-first1-exact=1
person;(0,0);name;last_name-exact=1
person;(0,1);name;first_name-exact=0
person;(0,1);name;first_name-first1-exact=0
person;(0,1);name;last_name-exact=1

In the first line, the first name of the user record (John Smith) is compared to the first name of the sale record (John Smith). These match in both first and last names, so each of these features appear with a 1 in the array. In the second case the first name of the user record (John Smith) is compared to the second name in the sale record (Mary Smith). The first names and first initials do not match here, but the last names do. Note that the multiplicity indices begin with 0.

The end result in this example, is that the feature extraction process would generate multiple feature arrays to be sent to the algorithm; these are referred to individually as feature instance arrays. The instance arrays for the above example would be

[1,1,1, . . . ]
[0,0,1, . . . ]

If the sale record also had two addresses, then these would be an additional source of multiplicity. Suppose John and Mary's sale record came with two addresses: '120 Broadway' and '1401 Ocean'. Now 4 possible comparisons may need to be considered:

John Smith+120 Broadway
John Smith+1401 Ocean
Mary Smith+120 Broadway
Mary Smith+1401 Ocean Each of these would lead to its own feature instance array, and potentially different scores on the algorithm. To resolve this ambiguity in the final score, only the highest score for a given pair may be output by the scoring engine as discussed above. In other words, the scoring engine may test all possible combinations of input data, find the one with the highest confidence, and use that to make a scoring decision.

One embodiment for dealing with multiplicity in the features can be summarized in the following steps: 1) collect the array of required features from the list provided by a module (e.g., the scoring engine). Use the information in the user and sale records for the pair (e.g., the SMEs) to construct a representation (e.g., a tree) of each feature in the feature set, using integer tuples to represent the possible branching within the tree due to multiple feature entries. Then, do a depth-first search through the feature tree structure to find each individual combination of extracted features, which is referred to as the feature instance array.

In general, the number of feature instance arrays per tree is equal to the product of the number of entries for each subfield. If there are two names and 3 phone numbers on the sale, and two addresses for the user, then a total of 2*2*3=12 arrays will be generated. Each of these arrays may be treated as a separate score calculation by the scoring engine. Thus, an array of scores for the user-sale ID pair may be output, representing the input feature instance array. Take the max of this array, and output that along with the user-sale ID pair in the output file.

Figure 7:
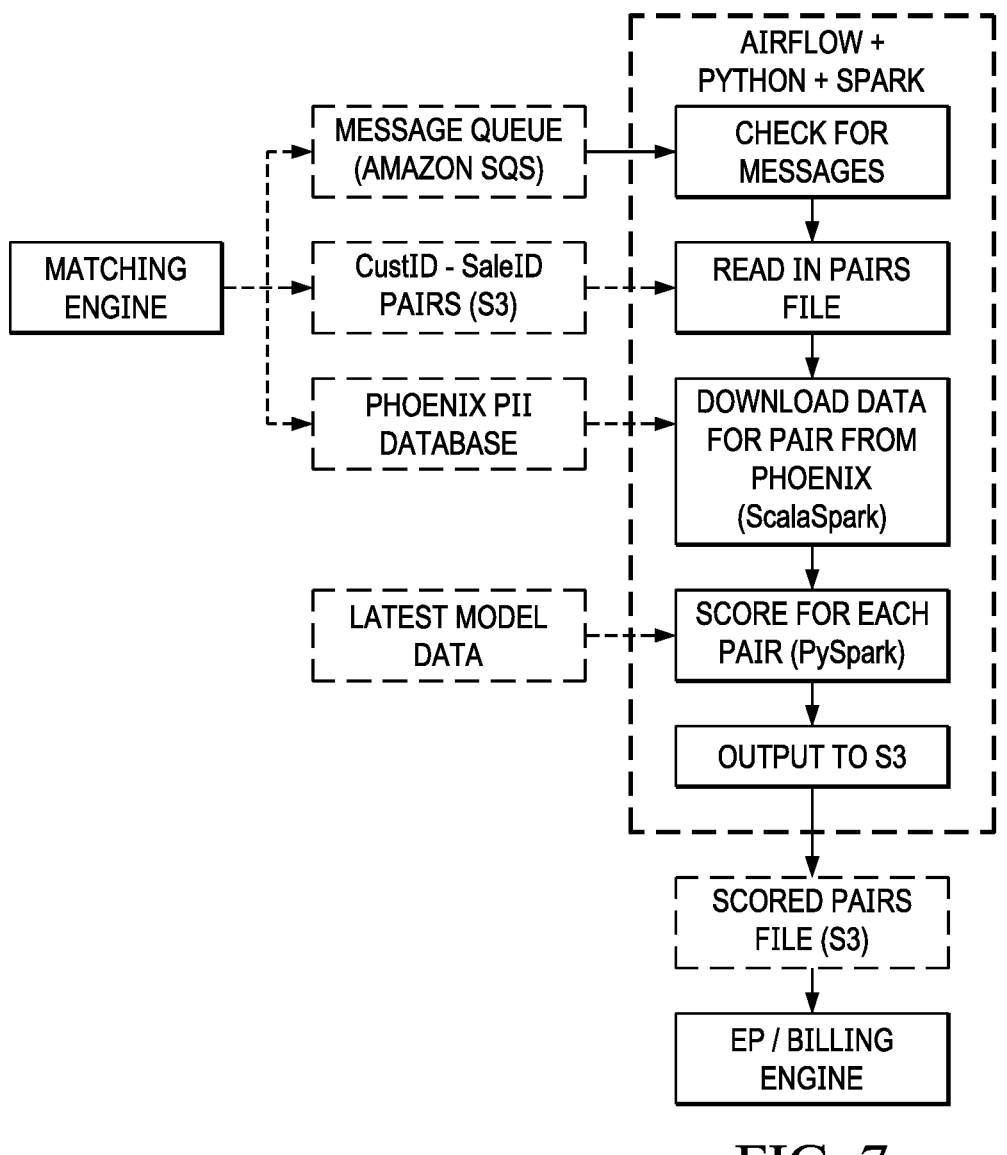
FIG. 7 is a block diagram of one embodiment of an implementation of a scoring engine.

To further aid in an understanding of certain embodiments FIG. 7 depicts a block diagram of one embodiment of an implementation of a scoring engine. Specifically, in FIG. 7 the breakdown of one embodiment of a software implementation for a scoring engine is depicted. User and sale data objects (e.g., SMEs representing users (user SMEs) and sales (sale SMEs)) are stored as JavaScript Object Notation (JSON) files in an Apache Phoenix database, while the ID pairs produced by the matching engine are stored in separate files in Amazon Web Services (e.g., AWS S3). Batch processing for a group of IDs is triggered by using the AWS SQS messaging system, which allows the locations of ID pair files to be stored in a queue for processing. The scoring engine periodically checks for messages from the messaging system, and when a valid message is found, the data for the pair is downloaded from Phoenix and processed. The output file is pushed back to the S3 file store at a predetermined location, and the triggering message is deleted.

Embodiments of a hardware architecture for implementing certain embodiments is described herein. One embodiment can include one or more computers communicatively coupled to a network. As is known to those skilled in the art, the computer can include a central processing unit (CPU), at least one read-only memory (ROM), at least one random access memory (RAM), at least one hard drive (HD), and one or more input/output (I/O) device(s). The I/O devices can include a keyboard, monitor, printer, electronic pointing device (such as a mouse, trackball, stylus, etc.), or the like. In various embodiments, the computer has access to at least one database over the network.

ROM, RAM, and HD are computer memories for storing computer instructions executable (which can be directly executed or made executable by, for example, compilation, translation, etc.) by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of compiled C++, Java, HTML, or any other programming or scripting code.

Additionally, the functions of the disclosed embodiments may be implemented on computers shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system, comprising:
a vehicle data system comprising:
a data store storing user data for a set of users and a set of historical transaction data comprising data on a set of sales of vehicles, the data for the set of users and the data for the set of historical transactions comprising a set of related data collected from a plurality of disparate data sources distributed across a computer network;
a non-transitory computer readable medium, comprising instructions for:
determining a first set of potential matches between the set of sales and the set of users, each potential match of the first set of potential matches comprising a matching user of the set of users for an associated sale of the set of sales, wherein each potential match of the first set of potential matches is determined by determining the matching user for the associated sale of the set of sales by applying a set of matching rules to compare the set of users stored in the data store to the sale based on applying the set of matching rules to the set of related data to determine the matching user, wherein the set of matching rules comprises rules for handling multiplicity in the set of related data, wherein the rules for handling multiplicity comprise:
identifying conflicting values for a single data field from different data sources;
selecting a representative value from the conflicting values based on a predetermined criterion; and
for each of the first set of potential matches:
determining values for that potential match for each of a set of features based on applying a feature extraction function for each of the set of features, each of the set of features corresponding to a related data item of the matching user and the associated sale of that potential match; and
applying parameters for a prediction function of a machine learning model to the values of the set of features to generate a confidence score for the potential match, wherein the machine learning model is adapted to be iteratively trained at one or more times using one or more training sets of data comprising historical pair sets, the historical pair sets comprising a first set of known user-sale matches approved via an automated process, wherein the iterative training of the machine learning model comprises:
refining the one or more training sets of data, the refining comprising updating the historical pair sets to include a second, overweighted set of confirmed user-sale matches to increase the decision-making ability of the scoring engine in borderline cases;
training the machine learning model using the one or more training sets of data thus refined; and
performing the refining and the training at one or more second times; and
automatically determining, by a billing engine, whether to invoice a dealer associated with the sale based on the generated confidence score.

2. The system of claim 1, wherein the historical pair sets comprise at least one known match of user and sale.

3. The system of claim 2, wherein the at least a portion of the historical pair sets are randomly selected.

4. The system of claim 1, wherein the matching rules are adapted to give greater weight to an exact match of related data.

5. The system of claim 1, further comprising approving the potential match when the confidence score for the potential match is above a threshold.

6. The system of claim 1, wherein, the feature extraction function generates a feature vector comprising a feature value for each related data item.

7. The system of claim 6, wherein the feature value for the related data item is determined based on an empirical function based on an analysis of historical transaction data associated with that related data item.

8. A method, comprising:

storing user data for a set of users and a set of historical transaction data comprising data on a set of sales of vehicles, the data for the set of users and the data for the set of historical transactions comprising a set of related data collected from a plurality of disparate data sources distributed across a computer network;

determining a first set of potential matches between the set of sales and the set of users, each potential match of the first set of potential matches comprising a matching user of the set of users for an associated sale of the set of sales, wherein each potential match of the first set of potential matches is determined by determining the matching user for the associated sale of the set of sales by applying a set of matching rules to compare the set of users stored in the data store to the sale based on applying the set of matching rules to the set of related data to determine the matching user, wherein the set of matching rules comprises rules for handling multiplicity in the set of related data, wherein the rules for handling multiplicity comprise:

identifying conflicting values for a single data field from different data sources;

selecting a representative value from the conflicting values based on a predetermined criterion; and for each of the first set of potential matches:

determining values for that potential match for each of a set of features based on applying a feature extraction function for each of the set of features, each of the set of features corresponding to a related data item of the matching user and the associated sale of that potential match; and applying parameters for a prediction function of a machine learning model to the values of the set of features to generate a confidence score for the potential match, wherein the machine learning model is adapted to be iteratively trained at one or more times using one or more training sets of data comprising historical pair sets determined to be at least one known match from the data for the set of users, the historical pair sets comprising a first set of known user-sale matches approved via an automated process, wherein the iterative training of the machine learning model comprises:

refining the one or more training sets of data, the refining comprising updating the historical pair sets to include a second, overweighted set of confirmed user-sale matches to increase the decision-making ability of the scoring engine in borderline cases;

training the machine learning model using the one or more training sets of data thus refined; and performing refining and the training at one or more second times; and automatically determining, by a billing engine, whether to invoice a dealer associated with the sale based on the generated confidence score.

9. The method of claim 8, wherein the historical pair sets comprise at least one known match of user and sale.

10. The method of claim 9, wherein the at least a portion of the historical pair sets are randomly selected.

11. The method of claim 8, wherein the matching rules are adapted to give greater weight to an exact match of related data.

12. The method of claim 8, further comprising approving the potential match when the confidence score for the potential match is above a threshold.

13. The method of claim 8, wherein the feature extraction function generates a feature vector comprising a feature value for each related data item.

14. The method of claim 13, wherein the feature value for the related data item is determined based on an empirical function based on an analysis of historical transaction data associated with that related data item.

15. A non-transitory computer readable medium, comprising instructions for:

storing user data for a set of users and a set of historical transaction data comprising data on a set of sales of vehicles, the data for the set of users and the data for the set of historical transactions comprising a set of related data collected from a plurality of disparate data sources distributed across a computer network;

determining a first set of potential matches between the set of sales and the set of users, each potential match of the first set of potential matches comprising a matching user of the set of users for an associated sale of the set of sales, wherein each potential match of the first set of potential matches is determined by determining the matching user for the associated sale of the set of sales by applying a set of matching rules to compare the set of users stored in the data store to the sale based on applying the set of matching rules to the set of related data to determine the matching user, wherein the set of matching rules comprises rules for handling multiplicity in the set of related data, wherein the rules for handling multiplicity comprise:

identifying conflicting values for a single data field from different data sources;

selecting a representative value from the conflicting values based on a predetermined criterion; and for each of the first set of potential matches:

determining values for that potential match for each of a set of features based on applying a feature extraction function for each of the set of features, each of the set of features corresponding to a related data item of the matching user and the associated sale of that potential match; and applying parameters for a prediction function of a machine learning model to the values of the set of features to generate a confidence score for the potential match, wherein the machine learning model is adapted to be iteratively trained at one or more times using one or more training sets of data comprising historical pair sets determined to be at least one known match from the data for the set of users and the set of historical transaction data, the historical pair sets comprising a first set of known user-sale matches approved via an automated process, wherein the iterative training of the machine learning model comprises:

refining the one or more training sets of data, the refining comprising updating the historical pair sets to include a second, overweighted set of confirmed user-sale matches to increase the decision-making ability of the scoring engine in borderline cases;

training the machine learning model using the one or more training sets of data thus refined; and performing refining and the training at one or more second times; and automatically determining, by a billing engine, whether to invoice a dealer associated with the sale based on the generated confidence score.

16. The non-transitory computer readable medium of claim 15, wherein the historical pair sets comprise at least one known match of user and sale.

17. The non-transitory computer readable medium of claim 16, wherein the at least a portion of the historical pair sets are randomly selected.

18. The non-transitory computer readable medium of claim 15, wherein the matching rules are adapted to give greater weight to an exact match of related data.

19. The non-transitory computer readable medium of claim 15, further comprising approving the potential match when the confidence score for the potential match is above a threshold.

20. The non-transitory computer readable medium of claim 15, wherein the feature extraction function generates a feature vector comprising a feature value for each related data item.

21. The non-transitory computer readable medium of claim 20, wherein the feature value for the related data item is determined based on an empirical function based on an analysis of historical transaction data associated with that related data item.

* * * * *